UNITED STATES PATENT OFFICE.

WILLIAM L. SILVEY, OF DAYTON, OHIO.

PROCESS OF UTILIZING MATERIAL OF WORN-OUT SECONDARY BATTERIES.

SPECIFICATION forming part of Letters Patent No. 562,776, dated June 23, 1896.

Application filed November 19, 1895. Serial No. 569,433. (No model.)

*To all whom it may concern:*

Be it known that I, WILLIAM L. SILVEY, a citizen of the United States, and a resident of Dayton, county of Montgomery, and State of Ohio, have invented a certain new and useful Process of Utilizing the Material of Worn-Out Secondary-Battery Plates in the Production of New Plates, of which the following is a specification.

My invention relates to a process of utilizing the material of worn-out secondary-battery plates in the manufacture of new plates.

The object of my invention is to utilize so-called "worn-out" battery-plates in the production of new ones; and by "worn-out" plates I mean those which by electrical action have their conductor converted into operative material, when the plates become useless. By my present invention I utilize the electrically-disintegrated material of the worn-out electrodes in producing new plates for another battery, or for replacing the worn-out plates referred to.

The positive plates are really the only ones in the battery which are worn out by electrolytic action; and by this action the active material is converted into a finely-divided and a gradually-increasing fineness of perioxidation, and at the same time the metallic plate, grid, or frame to which the peroxid of lead was attached is gradually converted into active material, until finally the plate, frame, or grid is nearly all peroxidized, when it becomes non-conductive of electricity and useless, for the reason that the materials will no longer adhere together.

A battery-plate involving my invention may be made of a perforated plate or grid, or it may be made of a plain sheet, or a rod; in fact, any form desired in which an electricity-carrying element, such as lead or lead alloy, is combined with lead in a finely-divided state.

A plate or grid of lead or lead alloy surrounded or associated with finely-divided metallic lead, sulfate of lead, or oxid of lead, and attached to the positive element of a suitable electric source, has its surface peroxidized at the same time the finely-divided material with which the plate is surrounded absorbs oxygen; and if the charging action is continued the proper length of time the sulfate of lead, finely-divided metallic lead particles, and the low-oxid particles, as well as the surface of the conducting-plate, are all reduced to a state of higher oxidation, called "peroxidation." The discharge of the battery-plate partially reduces this peroxid to sulfate, each successive charging and discharging reducing the peroxid to a finer state of division, and the oxidation of the plate penetrates deeper and deeper into the conductor-plate, so that if the battery is maintained in one place the peroxid is reduced to a soft, muddy mass of an inadherent nature, which will no longer adhere to the conductor-plate, when it falls off into the bottom of the containing-cell, and at the same time the conductor-plate is peroxidized deeper and deeper at each successive charge, so that finally the peroxidation of the plate is complete, or at least so far advanced that the usefulness of the conductor is gone, when the plate must be discarded, and either substituted by an entirely new one, or the material of which the plate was composed must be converted into a new one. This operation of converting old and worn-out plates into new ones is a point almost entirely neglected in accumulator installation. Hence when the conductor-plates in the positive element of batteries are disintegrated it has been customary to sell the material to corroding-works, where it is used in making white lead or reburned into metallic lead.

In carrying out my invention I proceed as follows: I take the worn-out positive-battery plates and thoroughly wash them to eliminate the sulfuric acid, and then subject the plates to the action of heat in order to drive out the liquid held in suspension, the above-mentioned elimination of the sulfuric acid preventing the formation of sulfid of lead during the heating process. The heating of the plates is continued until they are entirely melted, in which state I agitate the mass in such manner as to reduce the plates to finely-divided metallic lead and oxid of lead in varying degrees of chemical union, the free metallic lead being usually present in greater abundance than the lead oxid. The material is now ground to a fine powder and then thoroughly mixed with an equal quantity of commercial red lead, this mixture being preferably accomplished in a revolving cylinder.

To the material now obtained is added a sufficient quantity of dilute sulfuric acid to form a paste-like mass, which is spread over and evenly distributed upon an old conductor-plate or upon a new one. The plates when filled with this paste-like mass are hung up and subjected to atmospheric action until they become nearly dry, the material thus becoming partially hardened by the chemical action of the air. The plates are then suspended in a sulfuric acid-bath, which acts to form sufficient sulfate of lead from the metallic lead and low oxids of lead to cement the entire mass together. On again drying the plates in the air they will be found to gradually harden, and when sufficiently hard are ready for use.

It will be seen that by the above-described process the positive-battery plates, hitherto considered of little value when highly peroxidized, can be reworked and formed into new plates or into filling for new plates, and that the plates thus produced are much cheaper than those made wholly from new material.

Having thus described my invention, what I claim as new, and desire to secure by Letters Patent, is—

1. The process of utilizing the material of worn-out battery-plates in the production of new ones, which consists in first washing the plates in water to eliminate the sulfuric acid, then subjecting them to the action of heat in order to drive out the liquid held in suspension, then melting the plates and converting them into finely-divided lead and oxids of lead, then adding a quantity of low oxid of lead, then forming the material into a paste and applying the paste to a grid, and finally hardening the plates.

2. The process of utilizing the material of worn-out battery-plates in the production of new ones, which consists in first washing the plates in water to eliminate the sulfuric acid, then subjecting them to the action of heat in order to drive out the liquid held in suspension, then melting the plates and converting them into finely-divided lead and oxids of lead, then adding a quantity of low oxid of lead, then forming the material into a paste and applying the paste to a grid, then suspending the plates in a sulfuric-acid bath to form sulfate of lead to cement the material together, and finally hardening the plates.

3. The process of utilizing the material of worn-out battery-plates in the production of new ones, which consists in first washing the plates in water to eliminate the sulfuric acid, then subjecting them to the action of heat in order to drive out the liquid held in suspension, then melting the plates and converting them into finely-divided lead and oxids of lead, then adding a quantity of low oxid of lead, then forming the material into a paste and applying the paste to a grid, then suspending the plates in a sulfuric-acid bath to form sulfate of lead to cement the material together, and finally hardening the plates by exposing them to the action of the atmosphere until dried.

In testimony whereof I have hereto set my hand in the presence of two subscribing witnesses.

WILLIAM L. SILVEY.

Witnesses:
EMMA L. LELAND,
C. U. RAYMOND.